United States Patent
Moscaritolo et al.

(10) Patent No.: US 6,959,819 B2
(45) Date of Patent: Nov. 1, 2005

(54) FATIGUE RATED GLASS FILLED PLASTIC FILTER ASSEMBLY INCORPORATING A CORELESS PLASTIC FILTER ELEMENT WITH INTEGRAL SEAL

(75) Inventors: Daniel K. Moscaritolo, Thousand Oaks, CA (US); Kanwar Suri, Oxnard, CA (US)

(73) Assignee: PTI Technologies, Inc., Oxnard, CA (US)

( * ) Notice: Subject to any disclaimer, the term of this patent is extended or adjusted under 35 U.S.C. 154(b) by 130 days.

(21) Appl. No.: 10/266,225

(22) Filed: Oct. 8, 2002

(65) Prior Publication Data

US 2004/0065602 A1    Apr. 8, 2004

(51) Int. Cl.[7] ............................................. B01D 35/30
(52) U.S. Cl. ...................... 210/440; 210/442; 210/450; 210/453; 210/457; 210/493.2
(58) Field of Search ...................... 210/440, 442–444, 210/450, 453, 458, 493.2, DIG. 17, 497.01, 210/457; 55/502; 277/918

(56) References Cited

U.S. PATENT DOCUMENTS

| | | | | |
|---|---|---|---|---|
| 2,514,366 A | * | 7/1950 | Beyland | ...................... 210/442 |
| 3,262,565 A | * | 7/1966 | Silverwater | .................. 210/90 |
| 4,992,166 A | * | 2/1991 | Lowsky et al. | ............. 210/130 |
| 5,259,953 A | * | 11/1993 | Baracchi et al. | ............ 210/232 |
| 5,846,416 A | * | 12/1998 | Gullett | ........................ 210/232 |
| 6,024,229 A | * | 2/2000 | Ayers | .......................... 210/443 |
| 6,679,990 B2 | * | 1/2004 | Reinhart | ...................... 210/232 |

FOREIGN PATENT DOCUMENTS

JP          60238112 A  * 11/1985  ................. 210/443

* cited by examiner

Primary Examiner—Matthew O. Savage
(74) Attorney, Agent, or Firm—Pillsbury Winthrop Shaw Pittman LLP

(57) ABSTRACT

A filter assembly for filtering fluids which may be readily disassembled includes a perforated center tube assembly which is fluid-tightly connected at one end to an injection molded plastic head and is closed at its other end; an injection molded plastic bowl having one open end and a semi-closed second end; a disposable cylindrical plastic filter element adapted to fit within the plastic bowl and slip over the perforated center tube assembly in close proximity thereto but with no physical retention means between the plastic filter element and the center tube assembly. The assembly includes a releasable seal between the plastic filter element and the center tube assembly. The plastic head further includes an annular base provided with injection molded threaded fittings whereby it can be attached to a fluid supply and unfiltered fluid can flow into the plastic bowl and filtered fluid can flow out of the plastic bowl. The plastic head assembly further includes a mechanism for releasable engagement with the open end of the plastic bowl.

35 Claims, 9 Drawing Sheets

(Filter Element End Caps)

(110)

FATIGUE RATED GLASS FILLED PLASTIC FILTER ASSEMBLY INCORPORATING A CORELESS PLASTIC FILTER ELEMENT WITH INTEGRAL SEAL

BACKGROUND OF THE INVENTION

1. Field of the Invention

Embodiments of the present invention generally relate to filters assemblies, such as those used to filter lubricants. Particular embodiments of the present invention relate to plastic filter assemblies with replaceable plastic filter elements. The invention is broadly applicable and can be used in hydraulic, fuel and air filter applications.

2. Discussion of the Related Art

In order to remove contaminants from a flowing gas or liquid, the contaminated medium is often passed through a filter element in a filter. Filters are commonly used in the lubrication systems of standard internal combustion engines, e.g., automotive engines, truck or heavy equipment engines, and stationary power sources i.e. computer numerical control CNC machines, injection molding, die cast machines, compressors, etc.

Filtration systems used in these applications generally include a cylindrical housing into which a cylindrical filter is placed to remove particulate materials from fluids such as water or air. Two types of filter assemblies have commonly been used in lubrication system applications, filter assemblies with removable filter elements and disposable filter assemblies. In a commonly used "spin-on" disposable filter assembly, the filter element is sealed in a metal can with a metal core located in the center of the element for support structure. In such systems, to replace a clogged or dirty filter element, it is necessary to replace and dispose of the entire filter assembly.

In many filtration applications, the filter element must be changed periodically. For instance, in automotive applications the oil filter is typically changed every few thousand miles or every few months. There are a limited number of reusable oil filter types available or in use, but in most high quality lubrication systems, spin-on disposable filter assemblies are used, and these can create a disposal problem and are treated as hazardous material.

When filters were first introduced for use in lubrication systems, it was common to utilize cartridge type filter elements that fit into a removable housing. When the filter element needed replacement, the housing was removed from the oil filter mount on the engine, the cartridge was removed from the housing, the housing was cleaned, a new cartridge was installed, and the housing with the new cartridge was then replaced on the engine. Cartridge filters of that type usually included a cellulose filter membrane, exterior metal support, and a supporting center tube, typically of metal mesh or expanded metal. The metal supports, the center tube or outer wrap, were needed to prevent the filter from being crushed by the pressure generated in the lubricant being filtered. Differential pressures in an automotive hydraulic system can rise substantially at engine start-up, and particularly during malfunctions, such as a plugged filter malfunction (due, for example, to water or excess engine wear metals in the oil), and can reach 200 pounds per square inch (psi) or more.

Conventional practice in the past required the use of a support tube in combination with cellulose/glass fiber filters. The filter elements provided good filtering capability, and the metallic supporting structure provided the necessary rigidity and resistance to buckling due to the differential pressure between the inlet and outlet sides of the filter membrane. Disposal of the cartridge was complicated by the rigidly attached metal supporting structure that made crushing impractical and complete incineration impossible.

In more modem lubrication systems, spin-on disposable filter assemblies have been used. Spin-on disposable filter assemblies are typically more expensive, and create a greater disposal problem. However, the simplicity of removing an old filter and spinning a new one on in its place has overcome these drawbacks in many commercial applications. The spin-on filters include the typical cellulose filter elements, as well as an external shell of sheet metal, a center supporting tube, a threaded base plate and any necessary structure to hold the filter in place and prevent its damage. After it is used, the entire spin-on filter, metal shell and all, must be discarded.

Environmental regulations, the limited availability of landfills, and a greater awareness on the part of the public with respect to landfill pollution have created the need for an oil filter of the type which can be safely disposed of in an environmentally acceptable way. The canister type spin-on disposable filter assemblies are problematic because they have a substantial metal content, along with the paper content, gasket content, and residual oil. Even the older variety of cartridge type filters has disposal problems, because they contain both metallic parts (for support) as well as the cellulose parts (for filtering).

Attempts have been made to produce an environmentally disposably acceptable filter, (i.e., an environmentally friendly filter) but they have also suffered their drawbacks. For example, it has been proposed to utilize a filter cartridge with no metallic center support tube, and build the support tube into the filter housing. However, these approaches have been less than satisfactory for a number of reasons.

One type of spin-on filter with a replaceable/disposable filter cartridge designed to address these problems uses a radial seal as the main seal between the interior and the exterior of the filter element. However, a problem encountered when using a radial seal as the main seal involves the difficulty of disassembling the filter housing in order to change the cartridge. This type of sealing arrangement requires an unusual amount of torque to detach the cover from the housing. Even more significantly, while the center support tubes provide protection from crushing the filter paper elements in the radial direction, the filter element experiences significant pressure drops along its axis. Those pressure drops can be large enough to either unseat the filter and cause leakage around the main seal at one or the other end cap, or to begin to compress or crush the filter along its axis. Thus, although these filter cartridges have no metallic parts to complicate disposal, the filters themselves have significantly inferior structural properties and shorter lifespans as a result.

It is possible, by making certain compromises, to compensate for the lack of strength of an unsupported filter cartridge by using bypass valves either in the filter or in the engine. The function of a bypass valve is to respond to a pressure differential buildup caused, for example, by a plugged filter, and bypass oil around the filter. In effect, the bypass valve limits pressures in the system, but at the cost of passing unfiltered oil to the equipment. That might be acceptable in an automotive application, but in other applications it is completely undesirable. For example, a pressure relief valve is undesirable in those cases where passing unfiltered fluid might do permanent damage to the machinery being protected. Typical examples are a diesel fuel system or a hydraulic system. In such systems, it is considered preferable to allow the filter to plug to protect the equipment from a catastrophic and costly failure. To withstand the pressures as the filter plugs in such systems, the filter cartridge must have adequate structural support, which eliminates the possibility of using the unsupported filter cartridges that have been available in the past.

U.S. Pat. No. 5,556,542 ("the Berman et al. reference") discloses a snap-together, all-plastic filter assembly for filtering fluids that includes a cylindrical injection-molded plastic outer shell with a closed base and an open opposite end and which defines a hollow interior which receives a filtering element and an integral injection molded plastic endplate/center tube member. The outer shell is injection molded with a pair of concentric, generally cylindrical, inner annular walls which are integral with the closed base and extend part way toward the open end of the outer shell. The filtering element which has a hollow interior fits down within the outermost of the two concentric annular walls and the center tube of the endplate/center tube member extends through the center of the filtering element and snaps in place by means of snap-fit projections which snap into snap-fit pockets disposed within the inner most of the two concentric annular walls. The filter assembly is designed as a spin-on filter and is threadedly engaged and positioned onto a mounting base thereby completing the fluid flow path.

However, a major concern with plastic filter assemblies is the propensity of the filters to "grenade", i.e., explode into fragments that may damage the filter element or surrounding equipment. Therefore, there is a need for a safe, environmentally-friendly lightweight filter assembly that requires replacement and disposal of only the filter element, and that is not subject to grenading.

DETAILED DESCRIPTION

The present invention is directed to a multi-media filtration system adaptable to a standard "spin-on, spin-off" design, and which may be capable of separating particles at the micron and sub-micron level, yet provides the convenience of a replaceable filter element adaptable to a filter head or block in which all of the components may be reused except for any disposable filter element.

Embodiments of the present invention may incorporate a reusable center tube support that serves to position the filter element within the filter housing and/or to support the filter element against the hydraulic pressures being asserted by the fluid being filtered so as to minimize buckling, collapse, or blow-through and to isolate the filter element from other internal forces. Futhermore, in embodiments of the present invention, a plastic bowl may be designed to burst in a predictable manner at a predetermined position without grenading.

Figure 1:
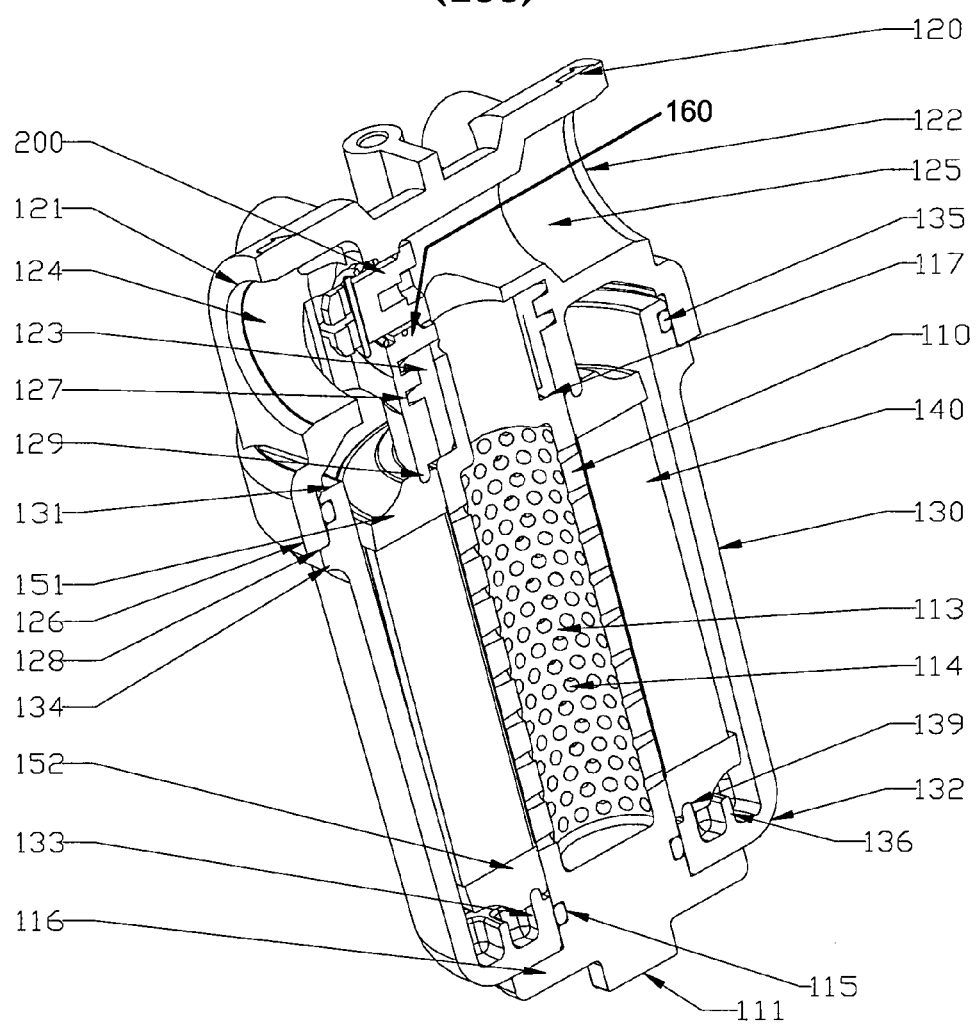
FIG. 1 illustrates a cross sectional view of the filter assembly according to an embodiment of the present invention.
Figure 2:
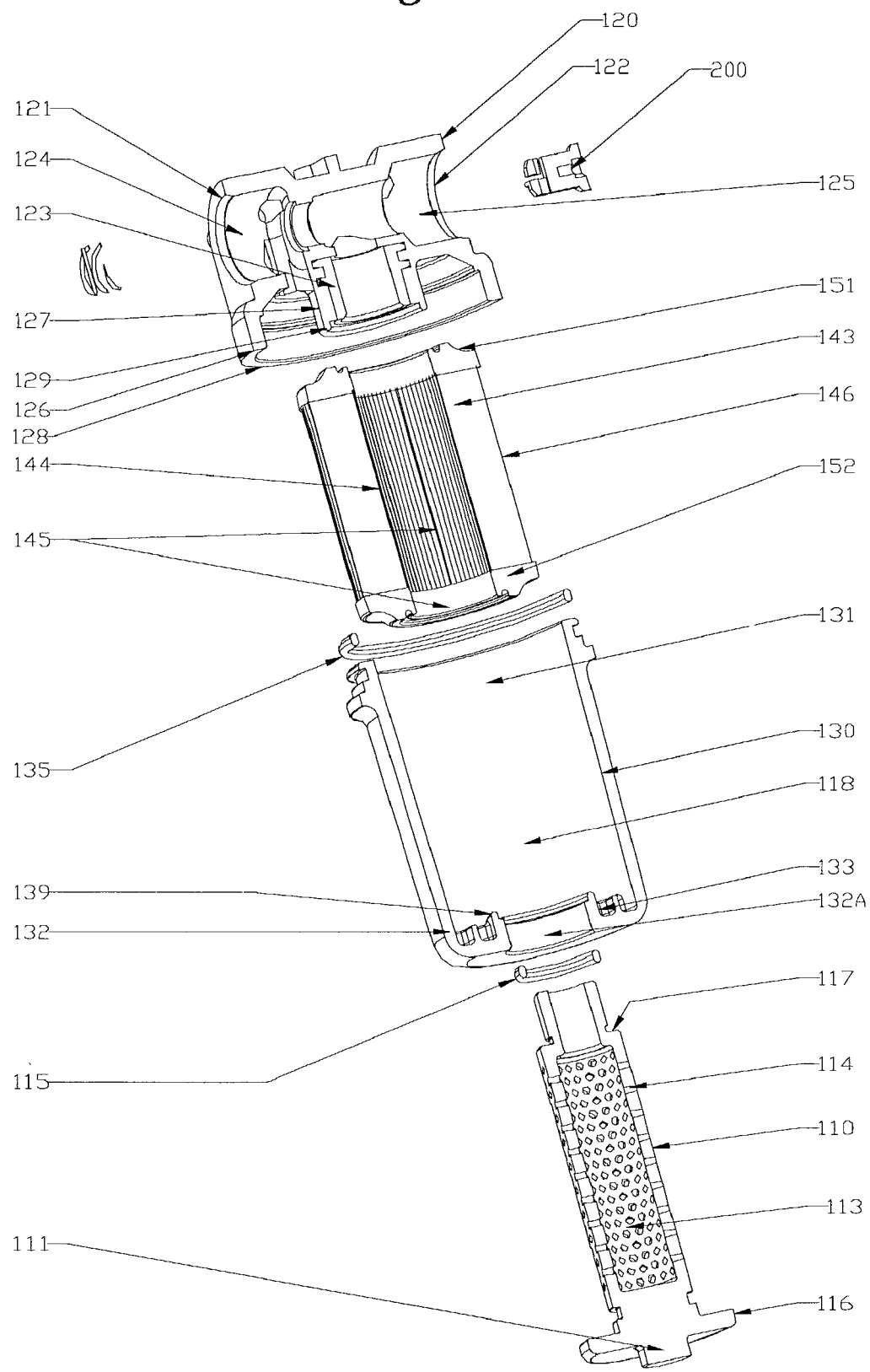
FIG. 2 illustrates an exploded view of the filter assembly according to an embodiment of the present invention.

FIG. 1 illustrates an embodiment of the filter assembly of the present invention. Filter assembly 100 includes a removable coreless filter element 140 for filtering fluids. The filter assembly 100 may be readily disassembled and includes a center tube assembly (CTA) 110. The CTA 110 may be sealingly connected at one end to a head 120 and is closed and terminated at its opposite end by a base structure 111. A portion of the CTA 110 may be perforated 114 and the filter element 140 may be disposed around this portion of the CTA 110. The CTA 110 and filter element 140 are contained within a bowl 130 when assembled to head 120. FIG. 2 illustrates an exploded view of the filter assembly 100 according to an embodiment of the present invention.

Figure 3:
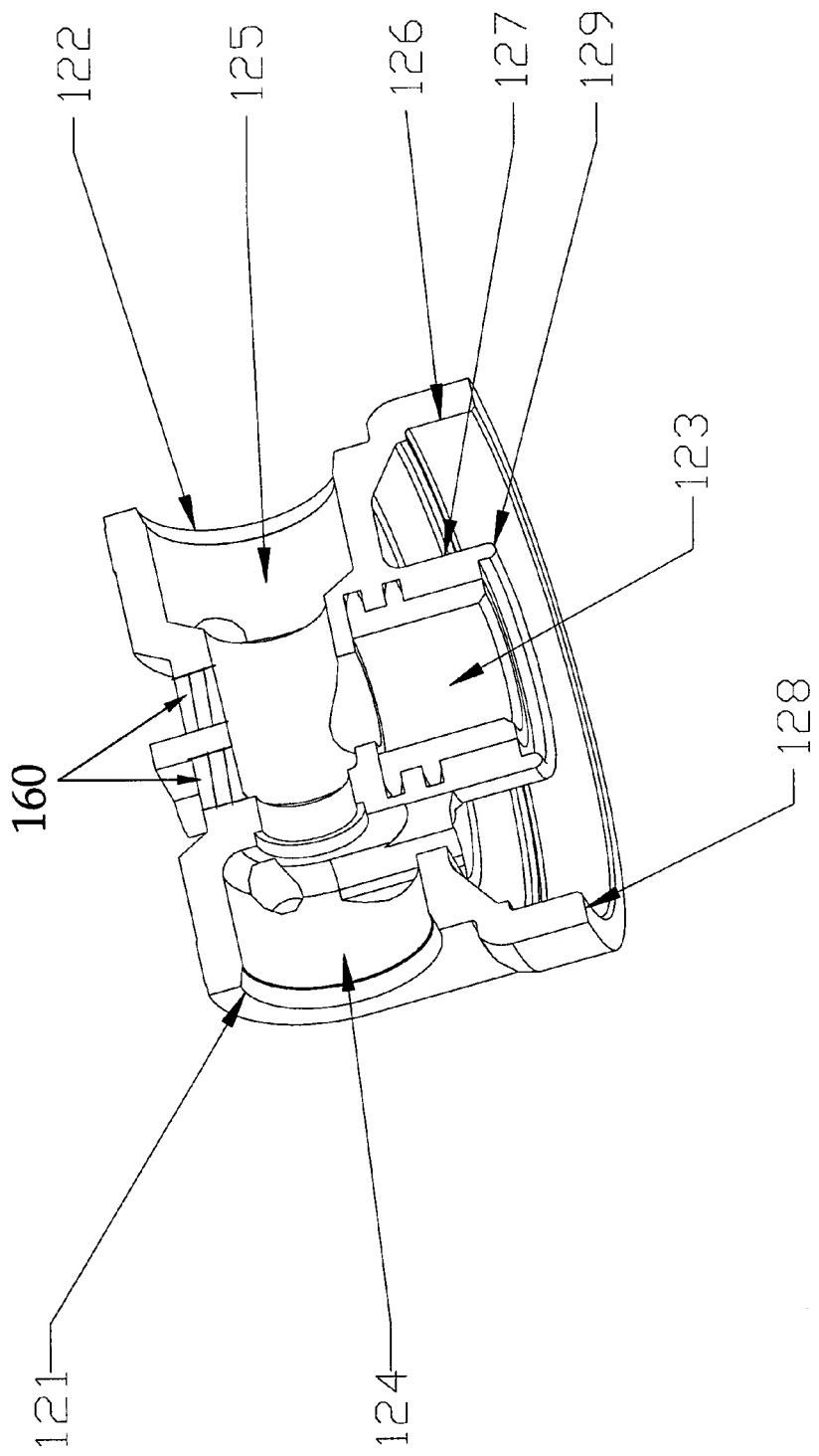
FIG. 3 illustrates a cross sectional view of the filter head according to an embodiment of the present invention.

FIG. 3 illustrates a cross sectional view of the head 120 according to an embodiment of the present invention. The head 120 may be unitary and may be formed from an injection-molded plastic. The head 120 may also include a unitary steel threaded insert 123 that is injection molded with the plastic. The head 120 may include a fluid inlet passage 124 through which an unfiltered fluid may be provided at the inlet side of the filter element 140, and a fluid outlet passage 125. The head 120 may also include a bypass valve 200 (see FIG. 1).

With reference to FIG. 1 and FIG. 3, the head 120 may also include fittings 121, 122 that may be formed above an exterior annular wall 126 forming an annular base structure. Fitting 121 allows attachment to a fluid supply whereby unfiltered fluid may flow from the fluid supply through the fluid inlet passage 124 into the bowl 130 and through the filter element 140. Filtered fluid may flow out of the filter element 140 into the perforated portion 114 of the CTA 110 and out of the filter assembly 100 through the fluid outlet passage 125 in the head 120 and into a return line attached to fitting 122. Fittings 121, 122 may be any type of fluid-tight seal coupling mechanism. However, injection molded threaded fittings are preferred. The head 120 may also include integral threaded ports 160 for mounting additional devices e.g., a differential pressure indicator, a flow meter, and a temperature gauge.

The head 120 may further incorporate an interior annular wall 127 unitary with the head and extending axially and concentric with the central/longitudinal axis of the filter assembly 100 and/or the CTA 110. The inner surface of the interior annular wall 127 may mate with the metal insert 123. The interior annular wall 127 may be disposed outside of the CTA 110. The interior annular wall 127 may include a "knife" edge 129 to form a fluid-tight seal with a first end cap 151 of the filter element 140.

The head 120 may further include an exterior annular wall 126 having a shoulder 128 that may provide a fluid-tight seal between the head 120 and an open end 131 of the bowl 130.

Figure 4:
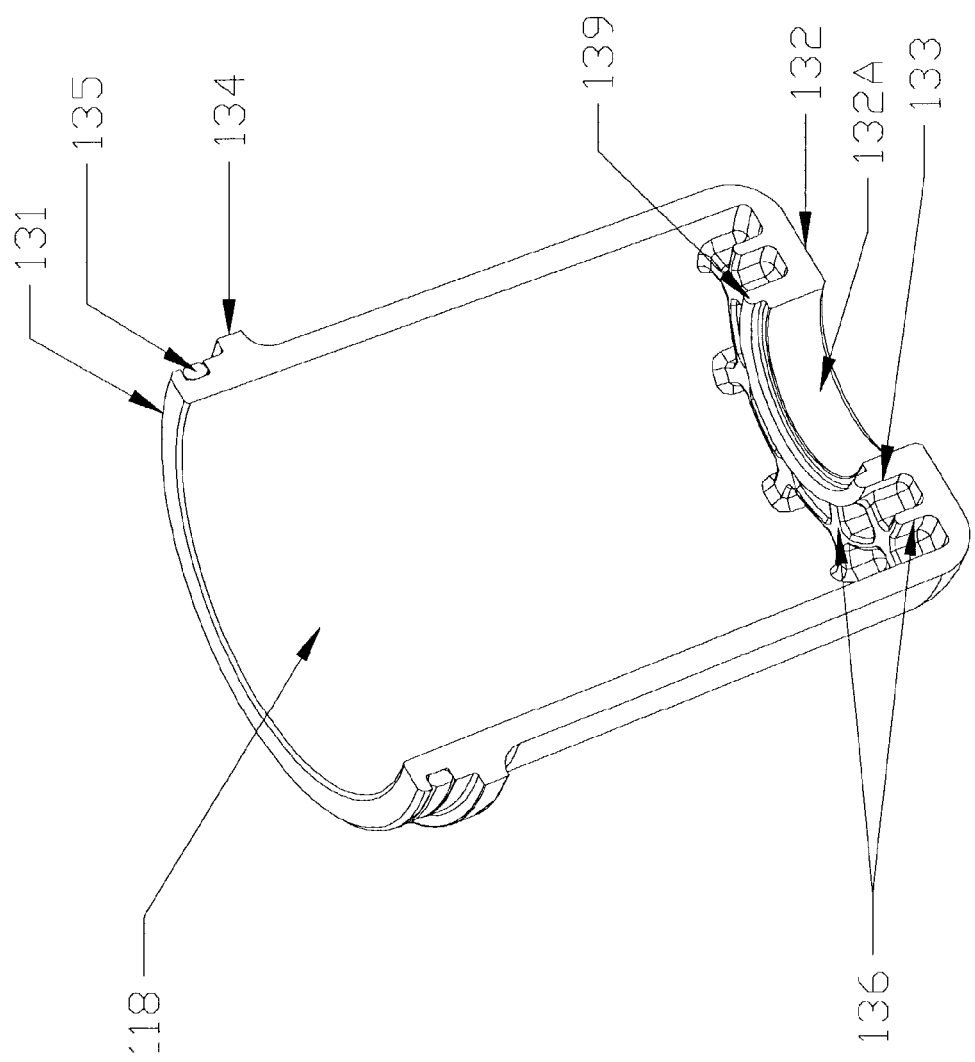
FIG. 4 illustrates a cross sectional view of the filter bowl according to an embodiment of the present invention.

FIG. 4 illustrates a cross sectional view of the filter bowl 130 according to an embodiment of the present invention. The bowl 130 may have an open end 131, a hollow interior 118 and a base 132 opposite to the open end 131. The bowl 130 may be unitary and may be formed from an injection molded plastic. The base may have an opening 132A through which the CTA 110 may be inserted into the filter assembly 100.

With reference to FIG. 1 and FIG. 4, the bowl 130 may include an interior annular wall 133 unitary with the bowl that extends into the hollow interior 118 from the base 132 toward the open end 131, the interior annular wall 133 defining the opening 132A in the base 132. The bowl 130 may also include an annular flange 134 that may abut the shoulder 128 of the exterior annular wall 126 of the filter head 120 when the filter element 140 is installed, and a radial seal 135 located around the open end 131 of the bowl 130 for slidingly forming a fluid-tight assembly with the exterior annular wall 126 of the head 120. The bowl 130 further includes integral interior structural ribs 136 located on the interior surface of the base 132. The interior annular wall 133 may include a knife edge 139 to form a fluid-tight seal with a second end cap 152 of the filter element 140.

Figure 5:
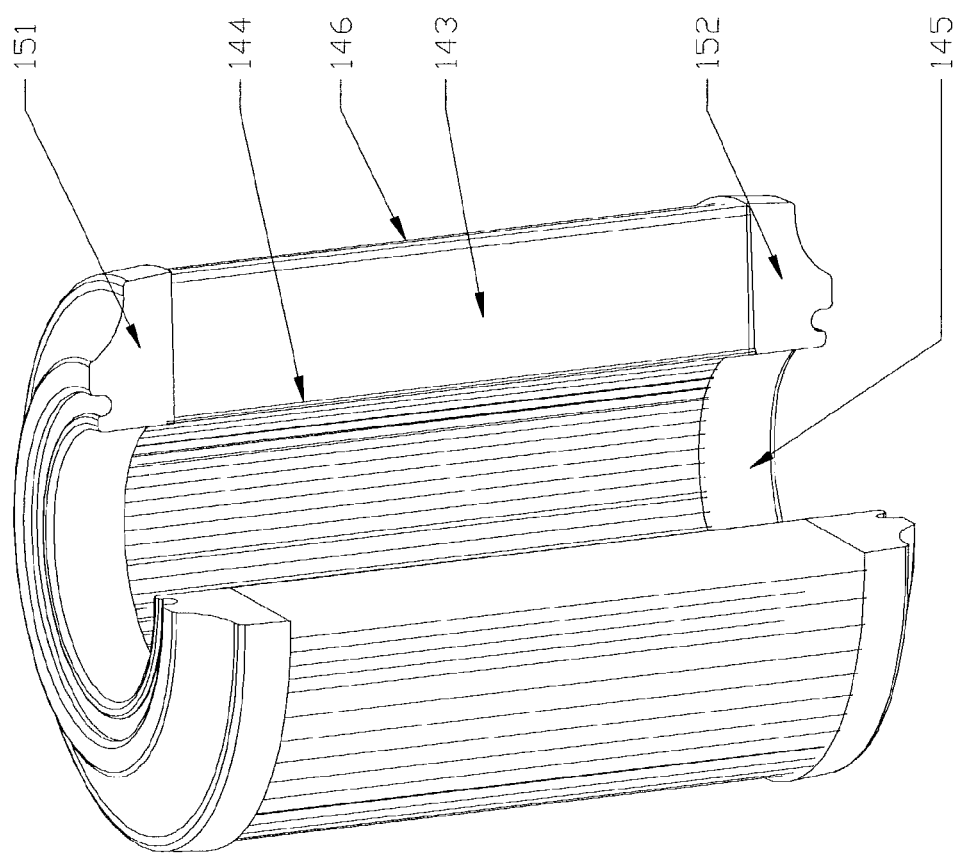
FIG. 5 illustrates a cut away sectional view of the filter element according to an embodiment of the present invention.

FIG. 5 illustrates a disposable cylindrical filter element 140 according to an embodiment of the present invention. The disposable cylindrical filter element 140 may have a first end cap 151 and an opposing second end cap 152 sealed thereto at each end. The filter element 140 may also have a hollow internal chamber 145 through which the CTA 110 may pass. The first end cap 151 and a second end cap 152 prevent fluid flow from flowing through the ends of the filter element 140, and separate the outlet side of the filter element 140 from the inlet side.

The filter element 140 may use a poly-elastomeric material for the end caps 151, 152, which gives structural integrity to the element pack and also provides a positive seal to the head 120 and base 132 of the bowl 130. The first end cap 151 and second end cap 152 may include a poly-elastomeric visco elastic-knife edge (VEKE) seal. This eliminates the use of conventional seal arrangements such as a face seal or o-ring.

The filter element 140 includes a filter media 143 arranged in a cylinder and defining an inner cylindrical wall 144 forming the internal chamber 145 and an outer periphery 146 that is also cylindrical. The filter element 140 may be configured so that it contains no supporting center tube that must be discarded with the media. The filter media 143 may be plastic and formed by a conventional pleated construction. Other forms of filter media are also usable.

The disposable center tube-free construction, along with the end cap construction (to be described below) which are of environmentally acceptably disposable materials, provide for a filter element which, after use, can be readily discarded. As one alternative, for example, filter element 140 can be incinerated, since it contains no toxic materials and no non-incineratable metal. As a further alternative, the filter element 140 can be crushed, which not only removes oil residue, but also substantially reduces the volume. The filter element 140, after being crushed to remove oil and reduce its volume, can be incinerated or deposited in a landfill. The disposable center tube-free construction is of significance in both of the disposal alternatives.

For the purpose of securing and sealing the ends of the filter, end caps 151, 152 form continuous ring-like discs secured to the filter media 143 at each end of the filter. The end cap material is preferably incineratable without creating toxic substances, and is also suitable for landfill disposal. A poly-elastomeric compound is a preferred material, configured as a molded poly-elastomeric ring.

Figure 6:
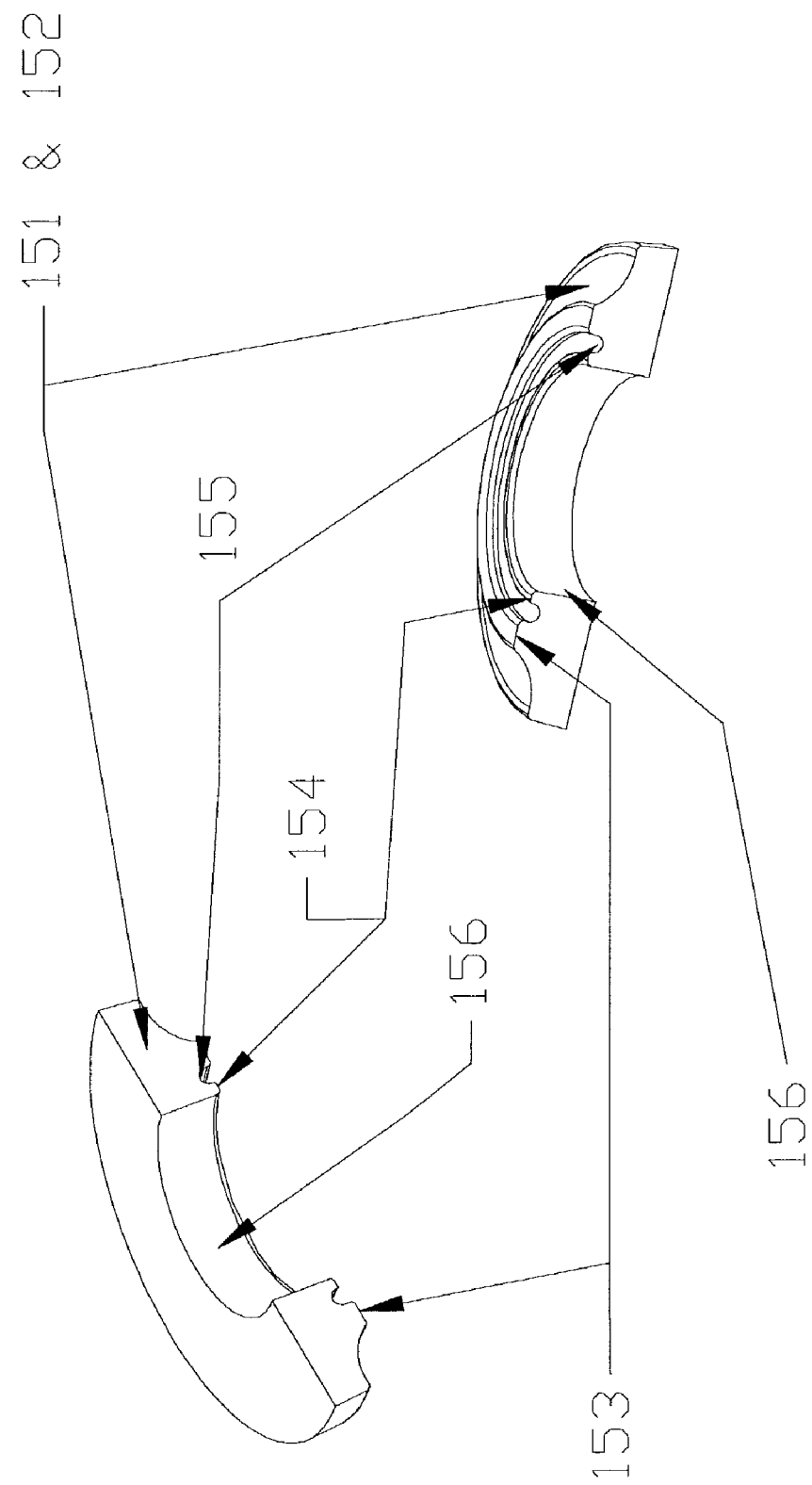
FIG. 6 illustrates a cross sectional view of the VEKE-Seal according to an embodiment of the present invention.

FIG. 6 illustrates the end caps 151, 152 in the form of a visco elastic-knife edge seal (VEKE-Seal) according to the preferred embodiment of the present invention. The end caps 151, 152 are manufactured from visco-elastic, a poly-elastomeric compound, formed in a molding operation in which the visco-elastic compound attaches to the pleats of the filter media 143. The visco-elastic compound is a soft compound which flows easily into a mold, deforms easily, and is compatable with hydraulic fluid, compressor oil, transmission oil, and motor oil. Visco-elastic has a 75 shore A durometer measurement to replicate the effect of a conventional o-ring.

Visco-elastic is a cross linked thermoset polymer that is classified as a polyurethane, consisting of 100 parts of polyester polyol and 30 parts of Isocyanate. The basic polyurethane includes a compound with hydroxyl groups (i.e. polyols) which when reacted with Isocyanate forms polyurethane. When both polyol and Isocyanate have a functionality of two or more, a cross-linked network, which is "thermoset" in nature forms. Visco-elastic has a high transmission fluid resistance with a minimal weight increase (1.4% weight increase when soaked in Trasmax S (Lot# M8121) @ 250° F. for 72 hours). Experimentation with a polyoxypropylene glycol, castor oil, and Isocyanate based polymer (22.6% weight increase when soaked in Trasmax S @ 250° F. for 72 hours) and a hydroxyl terminated polybutadiene and Isocyanate based polymer (40.1% weight increase when soaked in Trasmax S @ 250° F. for 72 hours) resulted in an incompatibility with transmission fluid.

In the preferred embodiment of the present invention, the end caps 151, 152 are formed of the moldable visco-elastic compound. The visco elastic-knife edge seal (VEKE-Seal) end caps deliver a better overall seal out or sealant effect. The endcaps 151, 152 may be made of another material, preferably a moldable elastomeric potting compound such as polyurethane, an epoxy, plastisol or another moldable, flexible material.

Figure 7:
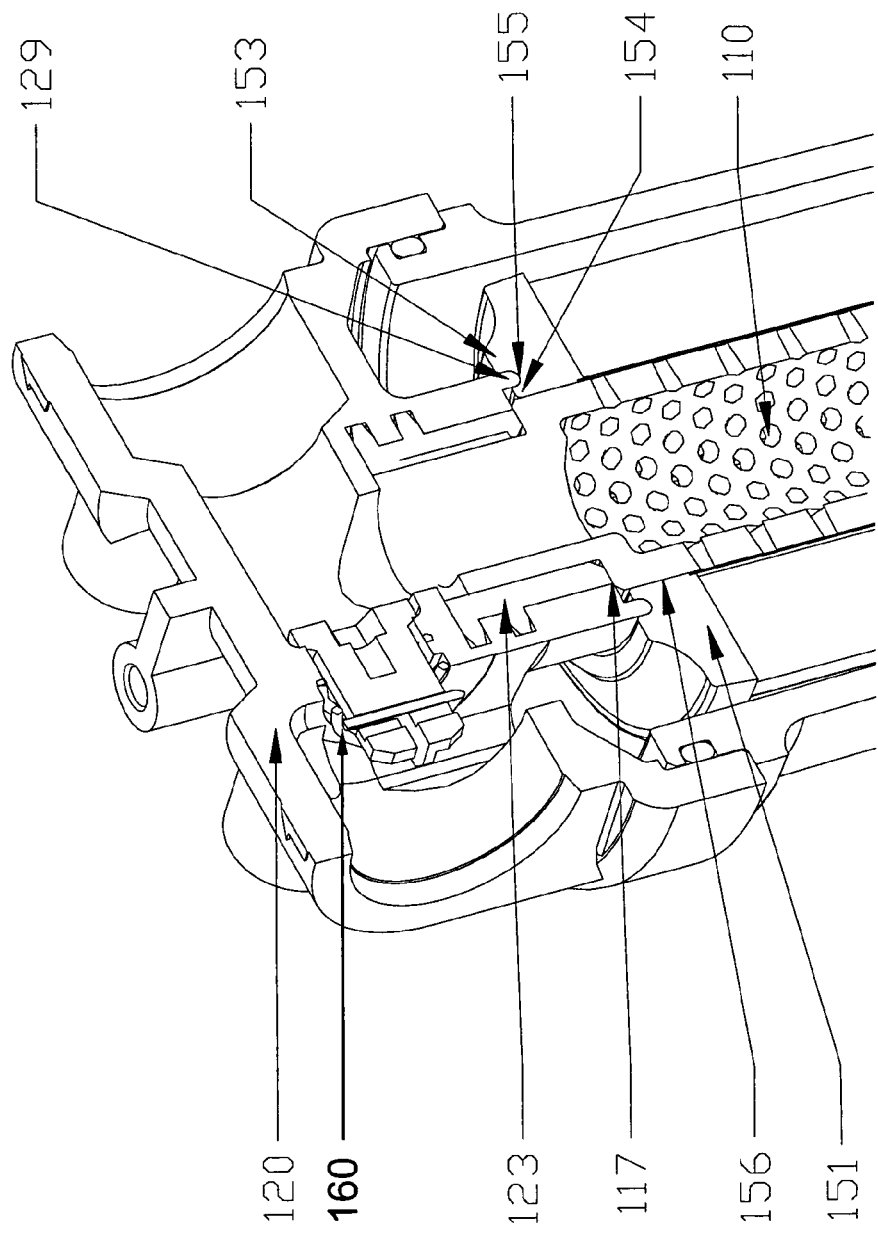
FIG. 7 illustrates an enlarged view of the VEKE-Seal to head portion of the filter assembly according to an embodiment of the present invention.
Figure 8:
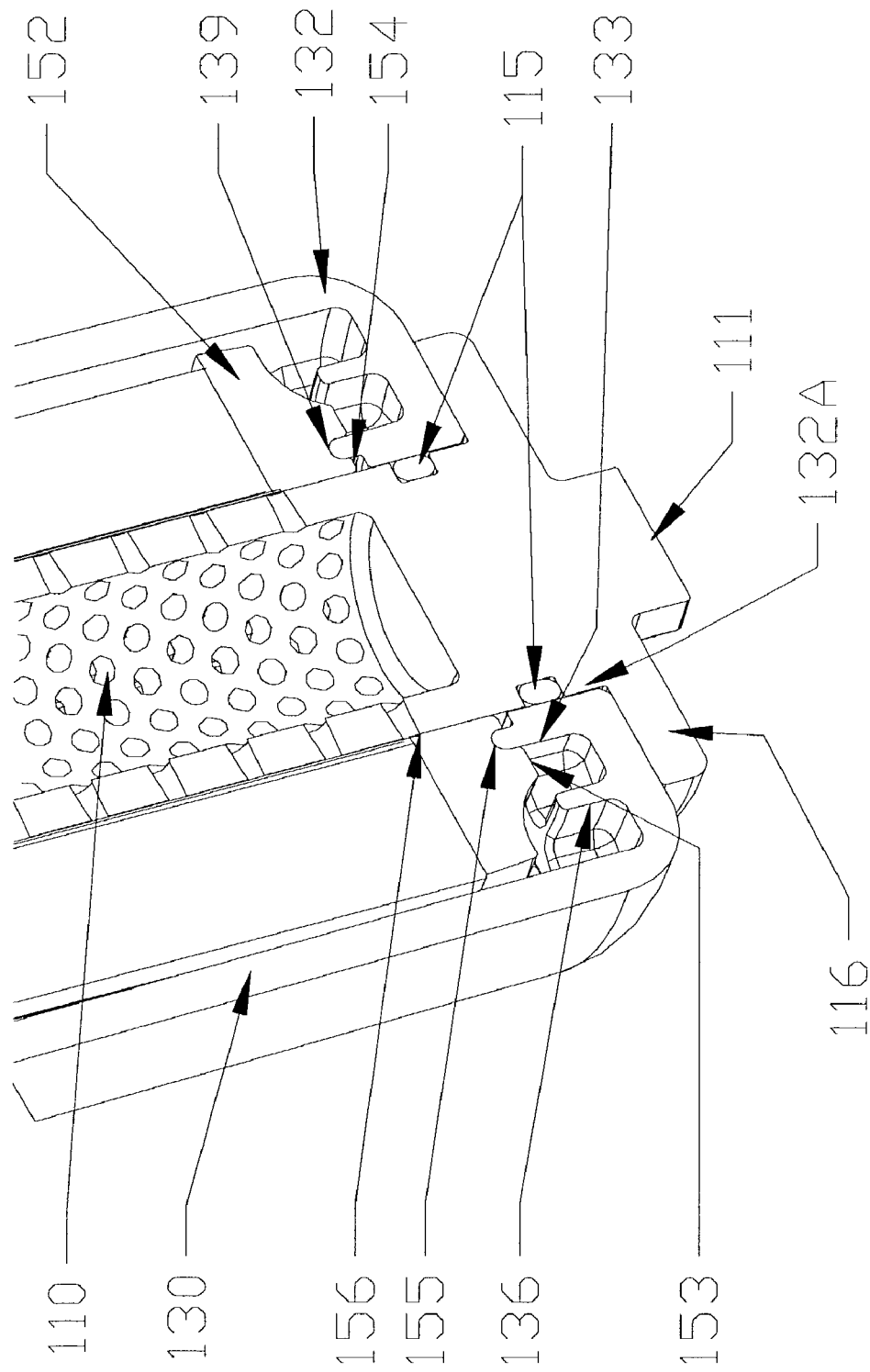
FIG. 8 illustrates an enlarged view of the VEKE-Seal to base portion of the filter assembly according to an embodiment of the present invention.

The structure and corresponding functionality of the VEKE-Seal end caps 151, 152 will now be more fully described with reference to FIG. 7 illustrating an enlarged view of the VEKE-Seal end cap 151 to head 120 interface of the filter assembly 100, FIG. 8 illustrating an enlarged view of the VEKE-Seal end cap 152 to base 132 of bowl 130 interface of the filter assembly 100, the cross-section view of FIG. 1, the cross-section view of FIG. 5 and the cross-section view of FIG. 6. The VEKE-Seal end caps 151, 152 include axially extending protrusions 153 and 154 which form a pocket 155 to receive the knife edges 129, 139 of the head 120 and base 132 of bowl 130, respectively. The potting operation partly encapsulates the margins of the pleated filter media 143. By virtue of the former connection, the VEKE-Seal end caps 151, 152 are securely fixed to the pleats, and therefore holds the shape of the filter 140.

The "knife" edges 129, 139 preferably have a rounded or beveled nose to facilitate mating with the VEKE-Seal end caps 151, 152 of the filter element 140. VEKE-Seal End caps 151, 152 may also include a substantially flat sealing surface 156. The sealing surface 156 forms a continuous cylindrical surface sized and adapted to mate with the outside of CTA 110.

Figure 9:
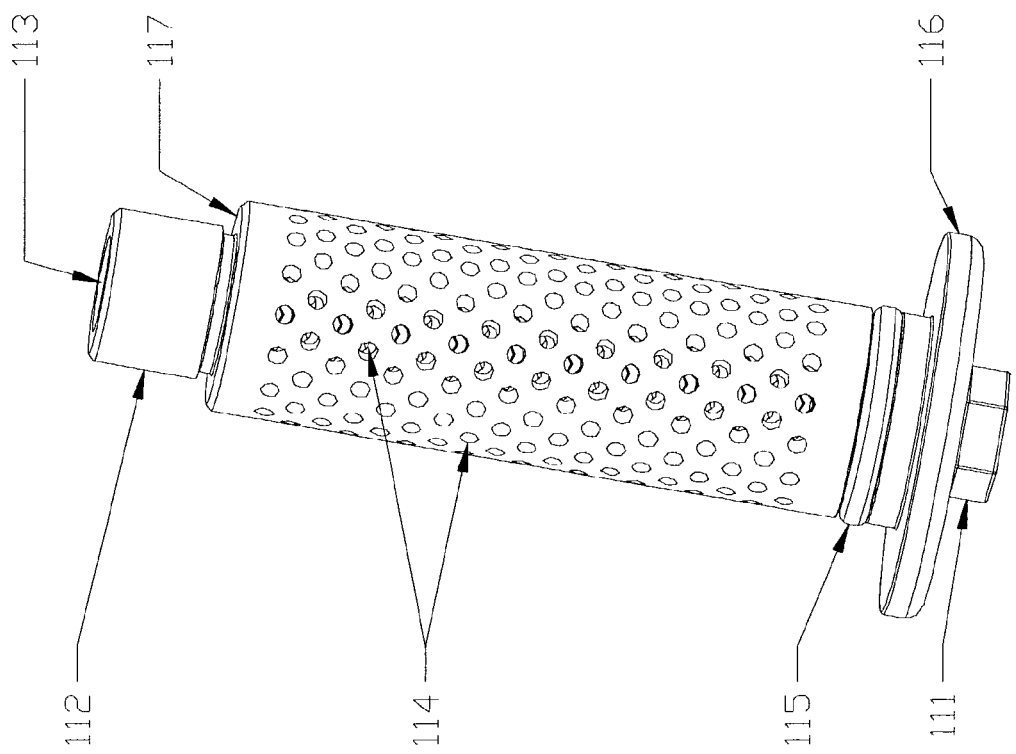
FIG. 9 illustrates a cross sectional view of the center tube assembly (CTA) according to an embodiment of the present invention.

FIG. 9 illustrates the CTA 110 according to an embodiment of the present invention. The CTA is unitary and made of metal. The CTA 110 may have a base 111 in opposing relation to a threaded top portion 112. The base 111 may be formed in various shapes including a hexagonal shape. The CTA 110 may also include a central flow passage 113, a plurality of fluid flow perforations 114, and a radial seal 115. Referring to FIG. 8, the radial seal 115 defines a friction interfit that sealingly engages the CTA 110 and the annular wall 133 when the CTA 110 is inserted through the opening 132A in the base 132 of the bowl 130.

Referring to FIG. 1 through FIG. 9, the disposable cylindrical filter element 140 is adapted to fit within the bowl 130 and adapted to slip over the perforated CTA 110 in close proximity thereto but with no physical retention mechanism between the filter element 140 and the CTA 110. The CTA 110 may extend through the hollow internal chamber 145 of the filtering element 140 and threadedly attach to the threaded metal insert 123 in the head 120 forming a fluid-tight connection with the fluid outlet 125, to secure the CTA 110, the filtering element 140, and the bowl 130 to the head 120. The CTA 110 may incorporate a shoulder 117 that seats against the threaded metal insert 123 in the head 120 to prevent overtightening of the CTA 110/insert 123 interface. The CTA 110 may also include a flange 116 located adjacent to the hexagonal shaped base 111.

The head 120, bowl 130 and/or filter element 140 may be made of a high strength engineered plastic which is lighter and less expensive than metals with similar strength, cost and corrosion properties. A plastic head 120 may be used with an injection molded metal insert 123. The CTA 110 may screw into this metal insert 123, thus assuring correct alignment of all parts while ensuring hydraulic integrity between the bowl 130, head 120 and filter element 140. This metal insert 123 may also prevent the threaded top portion 112 of the CTA 110 from stripping out associated plastic threads in the head 120 during cyclic impulse loading, i.e. fatigue.

The CTA's 110 shoulder 117 may bottom out against the face of the metal insert 123 during coupling of the filter element 140 and bowl 130 into the head 120. This prevents over-tightening of CTA 110 into the head 120-which would otherwise cause structural damage to the plastic bowl 130.

The radial seal 115 interface at the bottom of the CTA 110 and the bottom of the bowl 130 may perform two important functions; (1) perfectly sealing the interface between the plastic bowl 130 and the CTA 110 during thermal excursions (temperature cycling from hot to cold and vice versa) even with the mismatch of the thermal coefficients of expansion between plastic and metal, (2) providing sufficient friction between the CTA 110 and the bottom of the bowl 130 to prevent the CTA 110 from dropping out when the bowl 130 is removed from the head 120.

Prior reluctance to use plastic bowls is due to the fact that plastic "grenades" when it hydraulically bursts at high pressure-sending plastic shrapnel in all directions. To overcome this problem the head 120 and bowl 130 may be made from e.g., Stanyl TW241F10, a fatigue rated glass-filled plastic manufactured by DSM Manufacturing, that can endure 1 million fatigue cycles from 0 to 200 back to 0 psig. Furthermore, the filter design is unique in that it will burst in a predictable manner at a predetermined position without grenading. Referring to FIG. 4 and FIG. 8, the plastic bowl 130 will burst (under sufficient pressure) at the interior annular wall 133 allowing the full force of the resulting high-pressure spray (during burst) to be deflected away from personnel by the flange 116.

Additionally, the base 132 of the bowl 130 has integral structural ribs 136 which make the bowl 130 lighter (and less expensive) while optimizing the uniformity of the cooling of the hot-"as injected" unit. This uniformity of cooling minimizes residual stresses in the bowl 130. As a result, a plastic bowl 130 may have a strength approaching that of a cast aluminum bowl. Many samples of the bowl 130 were burst tested at 1400 psi at 200 degrees F.

The head 120, bowl 130 and/or filter element 140 may be made of a high strength engineered plastic that may also be manufactured in various colors. This enables manufacturers to use various visual combinations in order to custom color code their filter assemblies.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A filter assembly comprising:
   a head including a fluid inlet passage, a fluid outlet passage, and a first annular wall unitary with said head and extending axially and concentric with the center/longitudinal axis of the filter assembly, wherein a lower end surface of the first annular wall includes a knife-edge that matingly engages an upper end cap of a filter element to form a fluid-tight seal;
   a bowl having an open end defining a hollow interior and a semi-closed base opposite to said open end, said bowl further including a second annular wall unitary with said bowl and extending axially into the hollow interior from said semi-closed base toward said open end, said second annular wall defining an opening in the semi-closed base and having an upper end surface that matingly engages a lower end cap of the filter element to form a fluid-tight seal; and
   a center tube assembly (CTA) having a base in opposing relation to a threaded top portion, said CTA including a central flow passage and a plurality of fluid flow perforations, and a radial seal for defining a friction interfit that sealingly engages a radially outer surface of said CTA and a radially inner surface of said second annular wall when said CTA is inserted through said opening in the semi-closed base of said bowl, wherein said CTA extends through a hollow center portion of the filtering element and threadedly attaches to the head forming a fluid-tight connection with the fluid outlet, to secure the CTA, the filtering element, and the bowl to the head.

2. The filter assembly of claim 1, wherein the upper end surface of the second annular wall includes a knife-edge that matingly engages the lower end cap of the filter element to form the fluid-tight seal.

3. The filter assembly of claim 2, wherein the lower end cap includes a groove that matingly engages the knife-edge to form the fluid tight seal.

4. The filter assembly of claim 1, wherein the head is unitary and formed from an injection molded plastic.

5. The filter assembly of claim 4, wherein the head includes an injection molded annular threaded metal insert.

6. The filter assembly of claim 5, wherein the injection molded plastic head is made from a Fatigue Rated Glass Filled Plastic material.

7. The filter assembly of claim 6, wherein the injection molded plastic is manufactured in various colors.

8. The filter assembly of claim 5, wherein the CTA includes a shoulder that seats against the metal insert in the head.

9. The filter assembly of claim 5, wherein an inner surface of the first annular wall mates with annular threaded metal insert, said first annular wall being disposed outwardly of said CTA and generally concentric with said CTA.

10. The filter assembly of claim 1, wherein the CTA is unitary and made of metal.

11. The filter assembly of claim 10, wherein the CTA has a hexagonal shaped base.

12. The filter assembly of claim 11, wherein a flange, with an outside diameter larger than the outside diameter of the hexagonal shaped base, is located adjacently between the hexagonal shaped base and the bowl.

13. The filter assembly of claim 1, wherein the bowl is unitary and formed from an injection molded plastic.

14. The filter assembly of claim 13, wherein the injection-molded bowl is made from a Fatigue Rated Glass Filled Plastic material.

15. The filter assembly of claim 14, wherein the injection-molded bowl is manufactured in various colors.

16. The filter assembly of claim 15, wherein the injection-molded bowl includes integral interior structural ribs located at the semi-closed base.

17. The filter assembly of claim 1, wherein the head includes a bypass valve.

18. The filter assembly of claim 1, wherein a radially outer surface of the bowl includes an annular flange and a radial seal located proximate the open end of the bowl for slidingly forming a fluid-tight assembly with the head.

19. A filter assembly comprising:
a filtering element having an upper end cap and a lower end cap;
a head including a fluid inlet passage, a fluid outlet passage, and a first annular wall unitary with said head extending axially and concentrically with the center/longitudinal axis of the filter assembly, wherein a bottom end surface of the first annular wall includes a first knife-edge that matingly engages the upper end cap of the filtering element to form a fluid-tight seal with the filtering element, wherein said upper end cap has first and second radial, axially-extending protrusion, said protrusion forming a recessed pocket therebetween, and said recessed pocket receiving the first knife edge to form the fluid-tight seal;
a bowl having an open end defining a hollow interior and a semi-closed base opposite to said open end, said bowl further including a second annular wall unitary with said bowl extending axially into the hollow interior from said semi-closed base toward said open end, said second annular wall defining an opening in the semi-closed base and having an upper end surface, wherein said upper end surface includes a second knife-edge that matingly engages the lower end cap of the filtering element to form a fluid-tight seal with the filtering element, and said lower end cap has first and second radial, axially-extending protrusions, said protrusions forming a recessed pocket therebetween, and said recessed pocket receiving the second knife edge to form the fluid-tight seal; and
a center tube assembly (CTA) having a base in opposing relation to a threaded top portion, said CTA including a central flow passage and a plurality of fluid flow perforations, and a radial seal for defining a friction interfit that sealingly engages a radially outer surface of said CTA and a radially inner surface of said second annular wall when said CTA is inserted through said opening in the semi-closed base of said bowl, wherein said CTA extends through a hollow center portion of the filtering element and threadedly attaches to the head forming a fluid-tight connection with the fluid outlet so as to secure the CTA, the filtering element, and the bowl to the head.

20. The filter assembly of claim 19, wherein the upper end cap and the lower end cap includes an elastomeric compound which attaches to pleats of the filtering element.

21. The filter assembly of claim 19, wherein the elastomeric compound is a cross linked thermoset polymer including 100 parts of polyester polyol and 30 parts of Isocyanate.

22. The filter assembly of claim 19, wherein the head is unitary and formed from an injection molded plastic.

23. The filter assembly of claim 22, wherein the head includes an injection molded annular threaded metal insert.

24. The filter assembly of claim 23, wherein the injection molded plastic head is made from a Fatigue Rated Glass Filled Plastic material.

25. The filter assembly of claim 24, wherein the injection molded plastic is manufactured in various colors.

26. The filter assembly of claim 23, wherein the CTA includes a shoulder that seats against the metal insert in the head.

27. The filter assembly of claim 23, wherein an inner surface of the first annular wall mates with the annular threaded metal insert, said first annular wall being disposed outwardly of said CTA and generally concentric with said CTA.

28. The filter assembly of claim 19, wherein the CTA is unitary and made of metal.

29. The filter assembly of claim 28, wherein the CTA has a hexagonal shaped base.

30. The filter assembly of claim 29, wherein a flange, with an outside diameter larger than the outside diameter of the hexagonal shaped base, is located adjacently between the hexagonal shaped base and the bowl.

31. The filter assembly of claim 19, wherein the bowl is unitary and formed from an injection molded plastic.

32. The filter assembly of claim 31, wherein the injection-molded bowl is made from a Fatigue Rated Glass Filled Plastic material.

33. The filter assembly of claim 32, wherein the injection-molded bowl includes integral interior structural ribs located at the semi-closed base.

34. The filter assembly of claim 19, wherein the head includes a bypass valve.

35. The filter assembly of claim 19, wherein a radially outer surface of the bowl includes an annular flange and a radial seal located proximate the open end of the bowl for slidingly forming a fluid-tight assembly with the head.

* * * * *